US012091884B1

(12) United States Patent
Sintonen et al.

(10) Patent No.: US 12,091,884 B1
(45) Date of Patent: Sep. 17, 2024

(54) DOORKNOB WITH FIXING MECHANISM, LOCK ARRANGEMENT AND OPENING TOOL

(71) Applicant: İLOQ Oy, Oulu (FI)

(72) Inventors: Tommi Sintonen, Oulu (FI); Juha Kyrönlampi, Oulu (FI); Matti Ylitalo, Oulu (FI); Samuli Maronen, Oulu (FI)

(73) Assignee: iLOQ Oy, Oulu (FI)

( * ) Notice: Subject to any disclaimer, the term of this patent is extended or adjusted under 35 U.S.C. 154(b) by 0 days.

(21) Appl. No.: 18/116,717

(22) Filed: Mar. 2, 2023

(51) Int. Cl.
*E05B 3/00* (2006.01)
*E05B 3/04* (2006.01)

(52) U.S. Cl.
CPC ................ *E05B 3/003* (2013.01); *E05B 3/04* (2013.01)

(58) Field of Classification Search
CPC ... E05B 3/00; E05B 3/003; E05B 3/04; E05B 3/10; E05B 3/02; E05B 3/08; E05B 3/065
USPC .......................................................... 292/347
See application file for complete search history.

(56) References Cited

U.S. PATENT DOCUMENTS

| | | | | |
|---|---|---|---|---|
| 283,134 A | | 8/1883 | Mills | |
| 4,342,478 A | * | 8/1982 | Foshee | E05B 55/005 292/352 |
| 5,685,583 A | * | 11/1997 | Meck | E05B 3/003 292/347 |
| 6,681,605 B1 | * | 1/2004 | Huang | E05B 55/005 292/DIG. 60 |
| 2001/0026071 A1 | * | 10/2001 | Kemp | E05B 3/003 292/348 |
| 2006/0043742 A1 | * | 3/2006 | Huang | E05B 59/00 292/336.3 |

FOREIGN PATENT DOCUMENTS

| | | | |
|---|---|---|---|
| DE | 10 2004 009 992 | 9/2005 | |
| EP | 1 577 465 | 9/2005 | |
| EP | 1908898 A1 * | 4/2008 | E05B 1/0007 |
| EP | 2 172 606 | 4/2010 | |
| ES | 2 397 022 | 3/2013 | |
| GB | 577552 | 5/1946 | |

OTHER PUBLICATIONS

Jun. 6, 2024 Search Report issued in International Patent Application No. PCT/EP2024/055252, pp. 1-14.
Seguflex—Bandagen: "Seguflex locks and keys," Jun. 30, 2019; http://www.seguflix-germany.com/PDFs/instructionsPDFs/1206_1306_1406_e.pdf.

* cited by examiner

*Primary Examiner* — Nathan Cumar
(74) *Attorney, Agent, or Firm* — Nixon & Vanderhye PC

(57) ABSTRACT

According to a first aspect of the invention, there is provided a doorknob (108) with a fixing mechanism (100) comprising at least a first locking member (102A) and at least a first spring element (104A) coupled with the first locking member (102A), wherein the spring element (104A) is configured to move the locking member (102A) to be in contact with a lock cylinder (106) to prevent movement of the doorknob in relation to the lock cylinder (106) in a longitudinal direction (CL). According to a second aspect of the invention, there is provided a lock arrangement comprising the doorknob (108) with a fixing mechanism (100) and the lock cylinder (106). According to a third aspect of the invention, there is provided an opening tool (110) for the doorknob (108) with the fixing mechanism (100).

15 Claims, 8 Drawing Sheets

DOORKNOB WITH FIXING MECHANISM, LOCK ARRANGEMENT AND OPENING TOOL

FIELD

Various embodiments relate to a field of locks, especially fixing mechanisms of doorknobs.

BACKGROUND

Doorknobs are replaceable components. The doorknobs are attached to lock arrangements by a fixing mechanism allowing removal of the doorknob if necessary. Therefore, the fixing mechanism shall provide openable attaching means for the doorknob which is also robust enough since the doorknob may be exposed to a high stress in use. The known fixing mechanisms have some drawbacks especially from a usability point of view.

Hence, there is a need for more sophisticated solution for the fixing mechanism of the doorknob.

BRIEF DESCRIPTION

According to an aspect, there is provided subject matter of independent claims. Dependent claims define some embodiments.

One or more examples of implementations are set forth in more detail in the accompanying drawings and the description of embodiments.

LIST OF DRAWINGS

Some embodiments will now be described with reference to the accompanying drawings, in which FIGS. 1A, 1B, 1C, 1D 1E and 8 illustrate a fixing mechanism according to embodiments of the invention;

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments.

Furthermore, words "comprising" and "including" should be understood as not limiting the described embodiments to consist of only those features that have been mentioned and such embodiments may contain also features/structures that have not been specifically mentioned.

Reference numbers, both in the description of the embodiments and in the claims, serve to illustrate the embodiments with reference to the drawings, without limiting it to these examples only.

The embodiments and features, if any, disclosed in the following description that do not fall under the scope of the independent claims are to be interpreted as examples useful for understanding various embodiments of the invention.

The applicant, iLOQ Oy, has invented many improvements for the electromechanical locks, such as those disclosed in various European and US patent applications and patents, incorporated herein as references in all jurisdictions where applicable. A complete discussion of all those details is not repeated here, but the reader is advised to consult those publications.

Nevertheless, the solution of the invention is aimed to the electromechanical locks, it may be applied in traditional locks as well. The doorknob of the electromechanical lock described in this application may act as antenna for NFC (near field communication), for example.

According a first aspect of the invention, there is provided a doorknob with a fixing mechanism comprising at least a first locking member arranged in the doorknob configured to move at least between a first and a second positions, and at least a first spring element coupled with the at least first locking member, wherein the spring element is configured to be compressed and to move the locking member towards the first position in which the locking member is configured to be in contact with a lock cylinder, when the doorknob is coupled with the lock cylinder, to prevent, at least partly, movement of the doorknob in relation to the lock cylinder in a longitudinal direction of the doorknob.

Figure 1A:
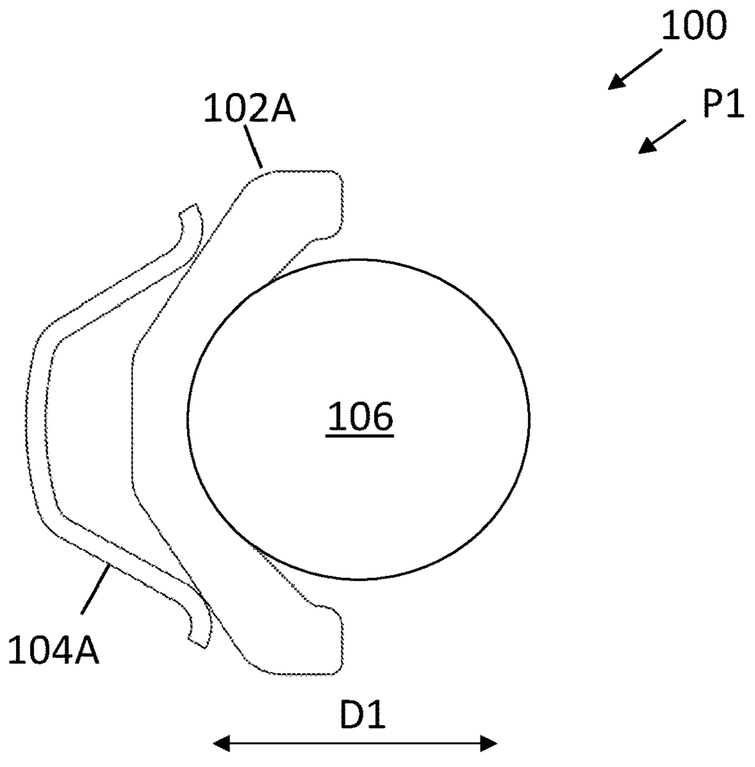

Referring to FIG. 1A, in which the first locking member 102A is in the first position P1 such that there is the contact between the locking member 102A and the outer surface of the locking lock cylinder 106. The first spring element 104A is coupled with the locking member 102A, and when the spring element 104A is compressed, it moves the locking member 102A towards the first position P1. The locking member is configured to move in a direction D1 in relation to the lock cylinder when moving between the first and the second positions. The direction D1 may be perpendicular to the longitudinal direction CL (FIG. 2) of the doorknob and the lock cylinder. In the first position, the locking member is configured to prevent, at least partly, movement of the doorknob in relation to the lock cylinder in the longitudinal direction. In other words, the locking member fixes the doorknob together with the lock cylinder.

Figure 1B:
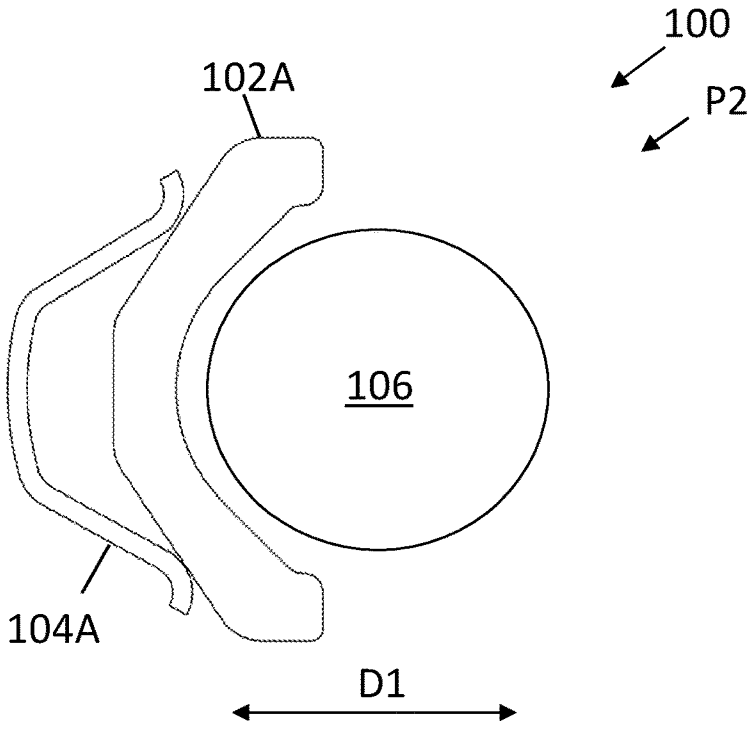

Referring now to FIG. 1B, in which the locking member 102A is in the second position P2 such that the locking member 102A is not in contact with the outer surface of the locking lock cylinder 106. So, when the locking member moves from the first position to the second position, it moves away from the lock cylinder in the direction D1. The locking member may move against the spring element such that the compression of the spring elements increased. The compression is configured to return the locking member to the first position. In the second position, the locking member is configured to enable movement of the doorknob in relation to the lock cylinder in the longitudinal direction. In other words, the doorknob can be removed from the lock cylinder.

In an embodiment, the fixing mechanism further comprises a second locking member configured to move at least between the first and the second positions, wherein the locking members are arranged next to each other in the doorknob such that there is a gap between opposite surfaces of the locking members configured to receive the lock cylinder, wherein the locking members are coupled with the spring element configured to be compressed and to move the locking members towards each other such that in the first position the locking members are configured to be in contact with the lock cylinder, when the lock cylinder is in the gap, to prevent movement of the doorknob in relation to the lock cylinder in the longitudinal direction of the doorknob. The fixing mechanism may also comprise more than two locking members. For example, there may be three or four locking members arranged the same way like the first and the second locking members.

Figure 1C:
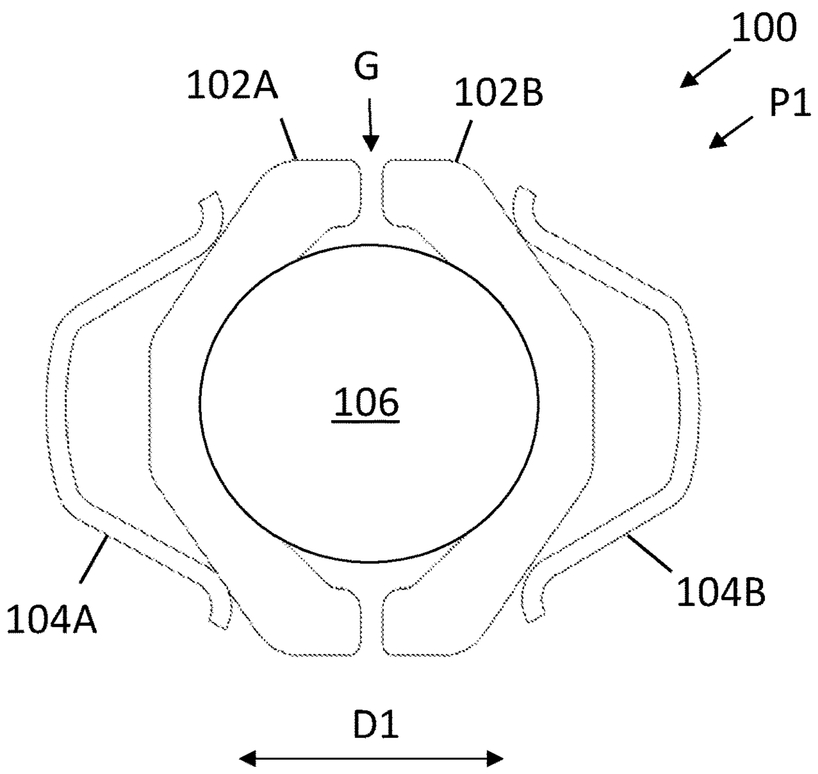
Figure 1D:
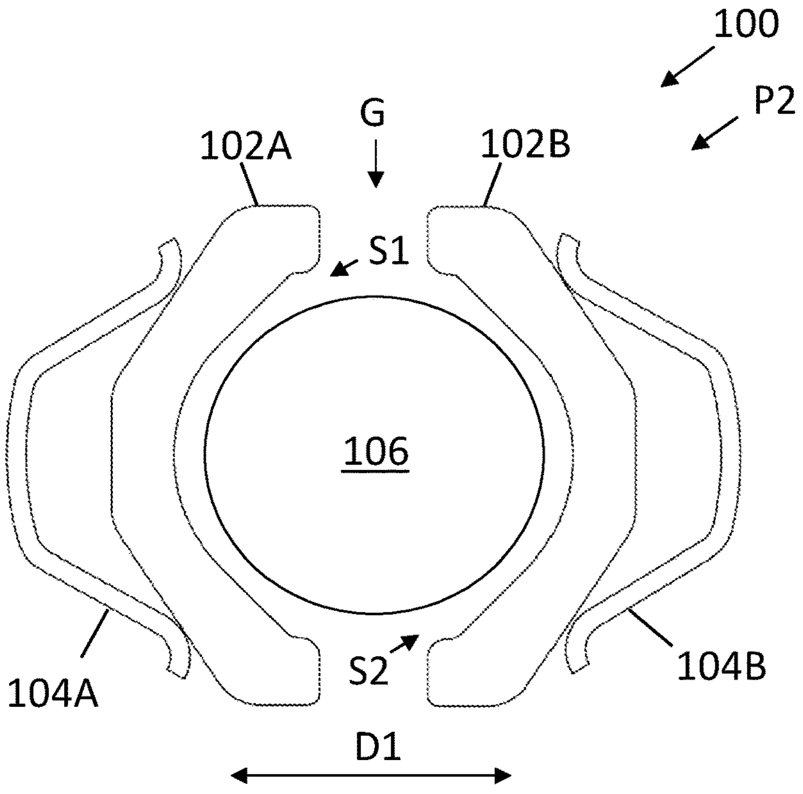
Figure 1E:
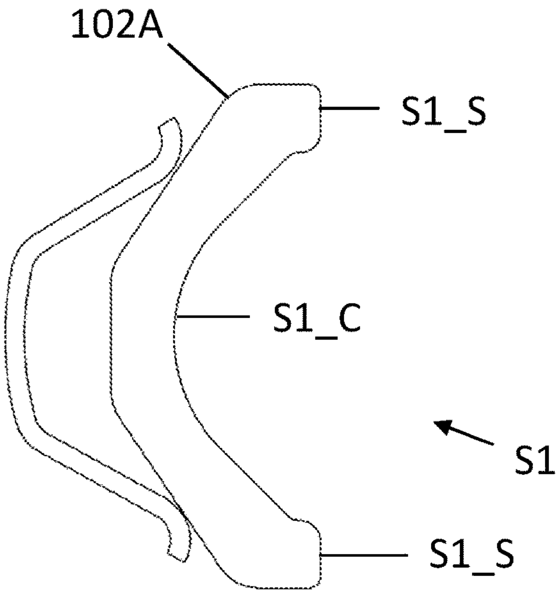
Figure 2:
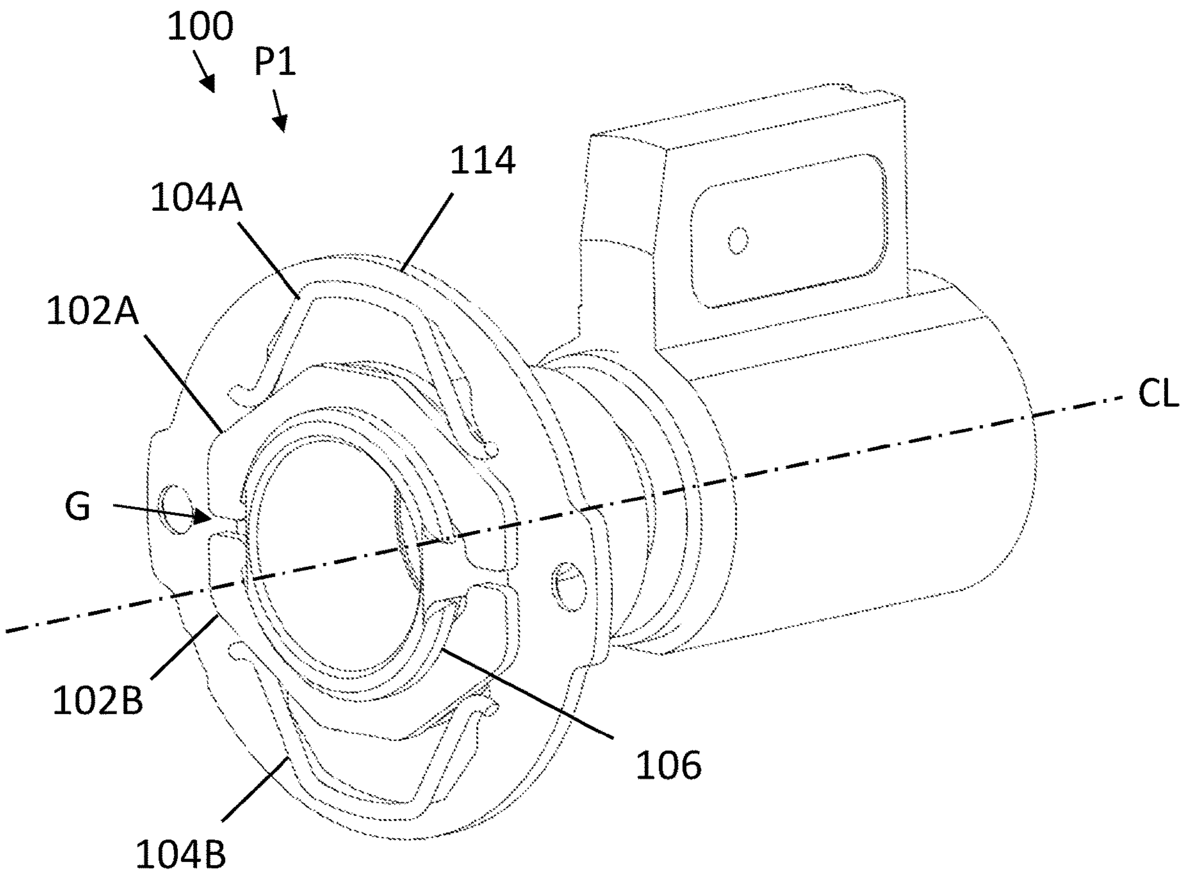
FIGS. 2 and 9 illustrates a lock cylinder with the fixing mechanism according to an embodiment of the invention.

FIG. 1C illustrates the first and the second locking member 102A-B in the first position P1 in which the locking members 102A-B are in contact with the outer surface of the lock cylinder 106 for locking the doorknob to the lock cylinder. Let us first study a structure of the fixing mechanism in detail. As can be seen in FIG. 1C the first and the second locking members 102A-B are configured to be next to each other (side by side) such that there is the gap G between them configured to receive the lock cylinder 106. The locking members may be arranged such that they are substantially mirror images from each other. FIG. 1D illustrates the opposite surfaces S1, S2 of the locking members 102A—B which are configured to be in contact with the lock cylinder 106 in the first position P1. The opposite surfaces may be arranged parallelly such that they are substantially against each other having the gap between them. FIG. 2 is an isometric view of the locking members 102A-B with the lock cylinder 106 illustrating that the opposite surfaces S1, S2 are on the same level in the longitudinal direction CL (center line) of the lock cylinder 106. The locking members may be perpendicularly arranged in relation to the lock cylinder such that the opposite surfaces of the locking members which are in contact with the outer surface of the lock cylinder are, at least partly, parallel to the outer surface of the lock cylinder. The locking member(s) may not press against the lock cylinder in the first position, the lock cylinder may comprise a counter feature for the locking members such that a side surface of the locking member may form the contact with the counter feature of the lock cylinder. The side surface may be perpendicular to the opposite surface. In other words, the surfaces of the locking members that are visible in FIGS. 1A-E may be the side surfaces. The locking member may be made of sheet metal, for example.

Figure 8:
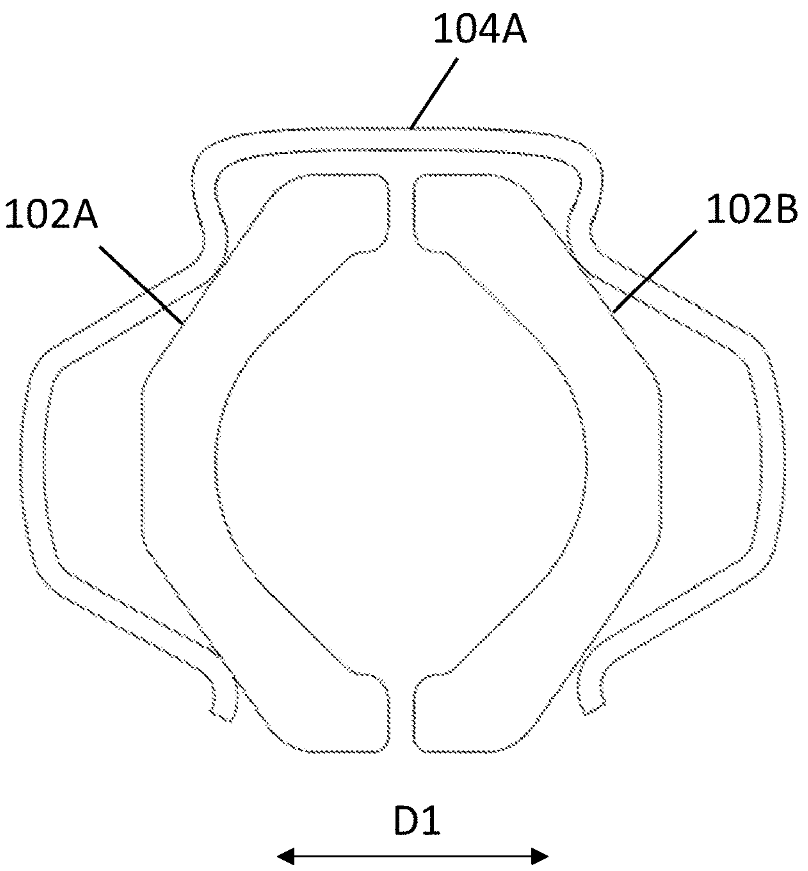

FIG. 8 illustrates an embodiment, wherein the first and the second locking members 102A-B are coupled with the first spring element 104A. In other words, there may be one common spring element for moving the locking members from the second position to the first position.

Figure 3:
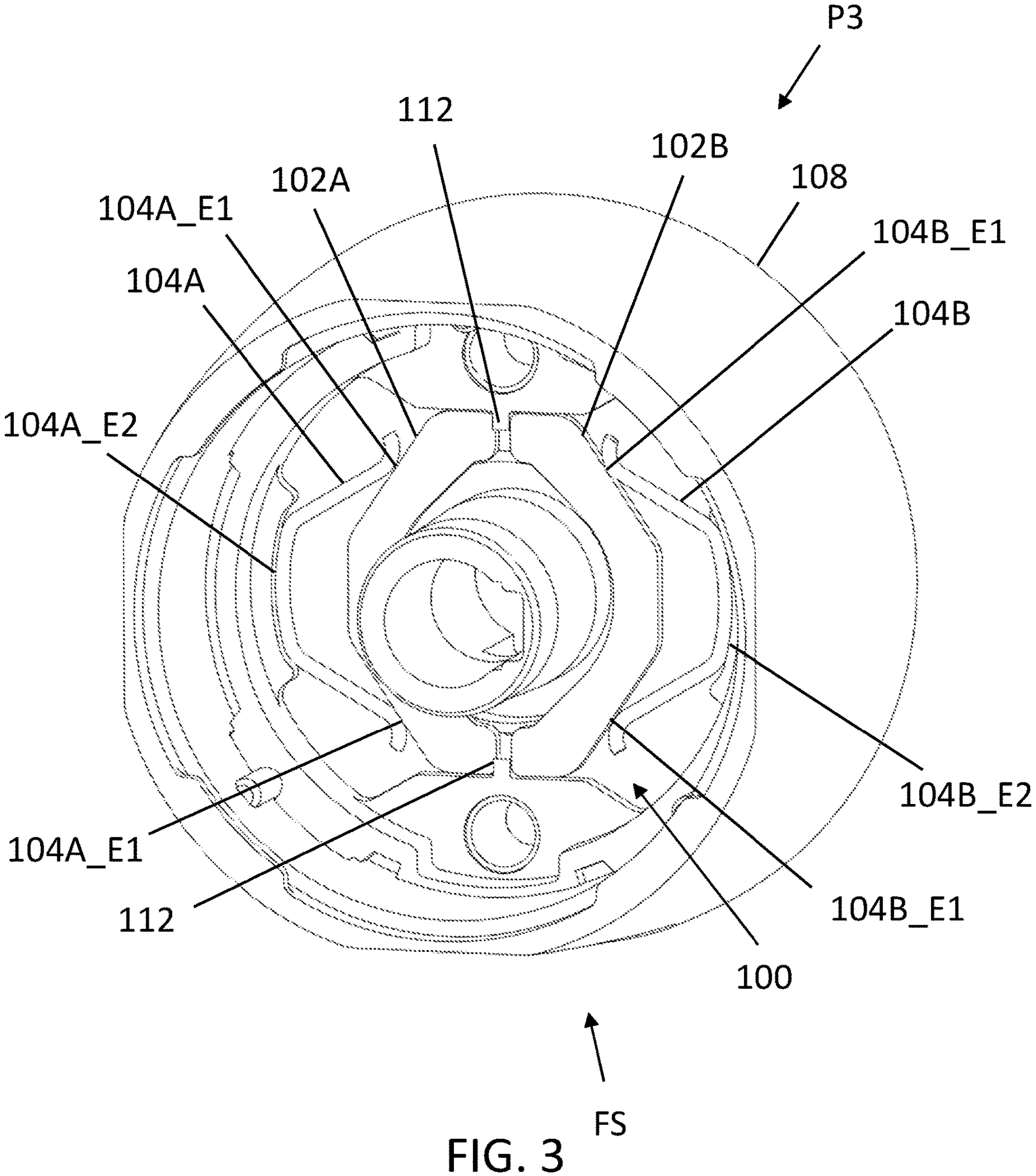
FIGS. 3, 6 and 7 illustrate a doorknob with the fixing mechanism according to embodiments of the invention.

Still referring to FIG. 1C, in an embodiment, the first locking member 102A is configured to be coupled with the first spring element 104A, and the second locking member 102B is configured to be coupled with the second spring element 104B. Both spring elements may also be coupled with the doorknob, as illustrated in FIG. 3, for preventing, at least partly, movement of the spring element in relation to the doorknob. The spring elements are configured to move the locking members towards each other in the direction D1 such that when the lock cylinder is placed between the first and the second locking member, they contact with the outer surface of the lock cylinder for preventing removal of the doorknob from the lock cylinder as illustrated in FIG. 1C. The direction D1 may be perpendicular in relation to the center line CL of the lock cylinder 106. So, the spring elements ensure proper contact between the locking members and the outer surface of the clock cylinder which enables proper locking effect. This is the first position P1 of the locking members 102A-B which attaches the doorknob with the lock cylinder. The spring elements may be made a steel spring wire having substantially C-shape, for example. The spring element may also be a coil spring.

FIG. 1D illustrates the first and the second locking members 102A-B in the second position P2. In an embodiment, when the locking members are moved from the first position towards the second position, they move away from each other in the direction D1. So, movement towards the second position is opposite compared to the movement caused by the spring elements. The first and the second locking members are moved against the spring elements causing compression of the spring elements. The gap between the lock elements increases when moving the locking members from the first position to the second position. Larger size of the gap in the second position enables removal of the doorknob from the lock cylinder. In other words, the size of the gap is greater that a diameter of the lock cylinder and the locking members are not anymore in contact with the outer surface of the lock cylinder.

In an embodiment, the spring elements are configured to return the first and the second locking members back to the first position from the second position. As described above, when force is applied against the spring elements such that the locking members are moved from the first position towards the second position, the spring elements are compressed. In other words, when force applied to the spring elements is greater than force provided by the spring elements, the spring elements are compressed. Force provided by the spring elements resist movement of the first and the second locking members from the first position to the second position and attempt to return them back to the first position. Force provided by the compression of the spring elements moves the locking members back to the first position when force is not applied to the spring elements anymore.

Let us now look at the locking member in detail. FIG. 1E illustrates a shape of the locking member according to an embodiment. The locking member 102A-B may comprise a curved section S1_C, S2_C in the surface which is towards the lock cylinder (opposite surface S1-S2). When the opposite surfaces are set against each other, the curved sections form the gap having, at least partly, a circular shape. This circular gap is configured to receive the lock cylinder. The curved surface of the locking member is configured to be in contact with the outer surface of the lock cylinder which may also be circular. Then the locking member is in contact with the lock cylinder from the greater area ensuring better locking effect.

Still referring to FIG. 1E, in an embodiment, the surface which is towards the lock cylinder (opposite surfaces S1-S2) of the first and/or the second the locking members 102A-B each further comprises straight sections S1_S, S2_S, such that the curved section S1_C, S2_C is substantially between the straight sections S1_S, S2_S. The straight section may be used for receiving an opening tool 110 for moving the locking members 102A-B from the first position P1 to the second position P2. Hence, the opposite surfaces each may comprise two straight sections arranged on both side of the curved section such that the curved section is substantially between the straight sections. The gap may still extend over the whole length of the opposite surfaces, but its size may be smaller at the point of the straight sections as can be seen in FIG. 1C-D, for example. FIG. 1E illustrates only the first locking member, but the same principles are valid also for the second locking member.

In an embodiment, a shape of the locking members 102A-B may be substantially C. Hence, another side of the locking member 102A-B, which is opposite to the opposite surface S1-S2, may be at least partly curved. This enables saving of a raw material in a manufacturing process of the locking members and enables smaller size of the locking member, for example.

FIGS. 1C, 1D and 2 illustrate an embodiment in which the first locking member 102A is configured to be in contact with a first side of the lock cylinder 106, and the second locking member 102B is configured to be in contact with a second side of the lock cylinder 106, wherein the first and the second sides are opposite. The fixing mechanism locks the doorknob strongly and evenly to the lock cylinder, and it does not twist the lock cylinder when the locking members are on the opposite sides of the lock cylinder.

Referring now to FIG. 3, which illustrates an embodiment wherein the first and/or the second spring elements 104A-B comprises a first and a second ends 104A_E1-E2, 104B_E1-E2, wherein the first end 104A_E1, 104B_E1 is coupled with the locking members 102A-B and the second end 104A_E2, 104B_E2 is coupled with the doorknob 108, and the doorknob 108 is configured to prevent movement of the second end of the spring element 104A_E2, 104B_E2 in relation to the doorknob 108. As described above, the spring elements are configured to compress when the locking members are moved from the first position to the second position. When the second ends of spring elements are coupled with the doorknob such that they cannot move in relation to the doorknob and the locking members are moved in the direction D1 towards the second position, the spring elements are compressed. In other words, the first end of the spring element moves towards the second end of the spring elements causing compression since the second end cannot move. The doorknob is configured to prevent movement of the second end of the spring elements at least in the direction D1 which is the direction in which the lock member moves when moved from the first position towards the second position. The spring elements may be coupled with a frame of the doorknob. The frame may comprise a surface for receiving the second end of the spring element preventing movement of the second end in relation to the doorknob.

In an embodiment, the spring element 104A-B is attached to the locking member 102A-B. When the locking member and the spring element are attached together, they form one component making the assembly process easier.

Referring to FIG. 3, in an embodiment, the arrangement 100 further comprises a limiter 112 arranged between the opposite surfaces S1_S, S2_S of the locking members 102A, 102B configured to receive the locking members and to limit a size of the gap G. In an embodiment, the straight sections of the locking members are configured to press against the limiter in the first position. The limiter may prevent pressing of the straight section together. In other words, it ensures that there is a predetermined gap between the straight sections. The gap in the straight section may be configured to receive the opening tool to move the locking members to the second position. In an embodiment, the limiter may be arranged in the doorknob. The limiter may be protrusion in the doorknob extending between the straight section of the opposite surfaces of the locking members.

Figure 4:
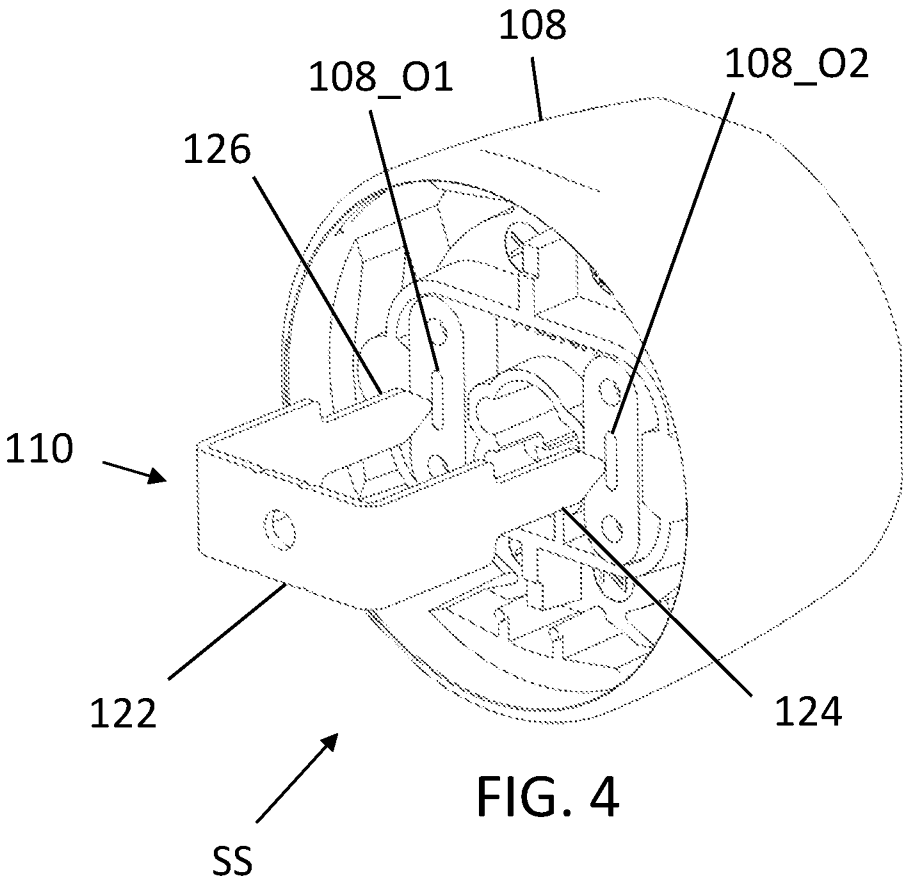
FIGS. 4 and 5 illustrate an opening tool of the fixing mechanism according to an embodiment of the invention.

Referring now to FIG. 4, in an embodiment, the doorknob 108 comprises one or more openings 108_H1-H2 in one side configured to enable access of the opening tool 110 to the one or more locking members 102A-B arranged in the doorknob. As described above, the fixing mechanism may be arranged inside the doorknob, the one or more openings are configured to enable access of the opening tool to the locking members inside the doorknob, and removal of the doorknob from the lock cylinder. The doorknob 108 may be, at least partly, open on a first side FS as illustrated in FIG. 3. The first side FS is configured to receive the lock cylinder and is towards the door when the doorknob is installed. A second side SS of the doorknob 108 is opposite to the first side FS, so it is headed away from the door when the doorknob is installed. The second side may comprise a cover (not illustrated in Figures) which is removed when removing the doorknob from the lock cylinder. The openings for the opening tool may be placed under the cover such that they are visible only when the cover is removed. Hence, when the doorknob is going to be removed from the lock cylinder, the cover is removed first, and the opening tool is then inserted into the openings of the doorknob allowing access of the opening tool to the locking members such that they can be moved towards the second position in which the doorknob can be removed from the lock cylinder.

Figure 6:
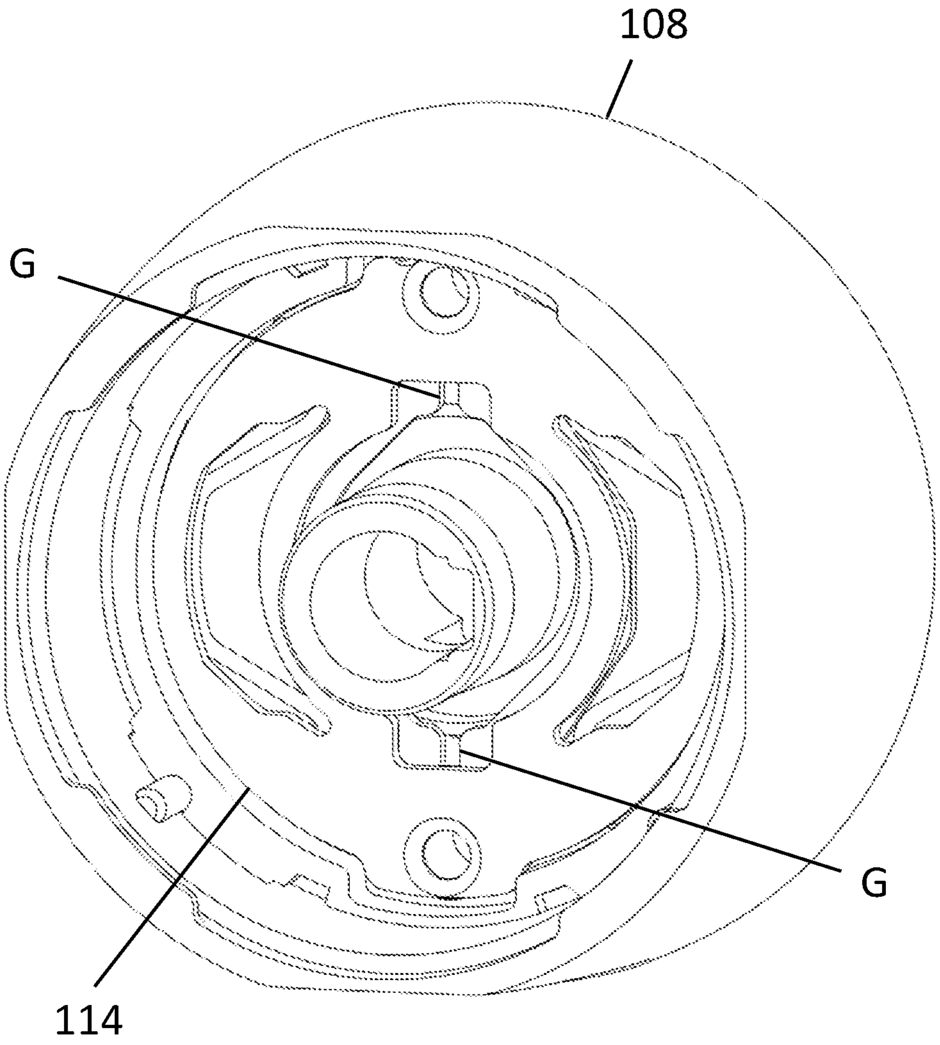

FIGS. 2 and 6 illustrate an embodiment in which the arrangement 100 further comprises a fastening member 114 configured to fasten the fixing mechanism in the doorknob. The fastening member may be a plate kind of structure which is assembled to the doorknob such that locking members and spring elements stay between the frame of the doorknob and the fastening members. The fastening member may be attached by screws, for example. The fastening member is configured to bear a part of axial force (in direction of CL) when the doorknob is fixed with the lock cylinder which reduces stress in the locking members. The axial force may appear when pulling or pushing from the doorknob to open or close a door, for example.

According to a second aspect of the invention, there is provided a lock arrangement comprising the doorknob with the fixing mechanism and the lock cylinder. In addition to the doorknob with the fixing mechanism and the lock cylinder, the lock arrangement may further comprise all the other essential components of the lock arrangement.

Figure 7:
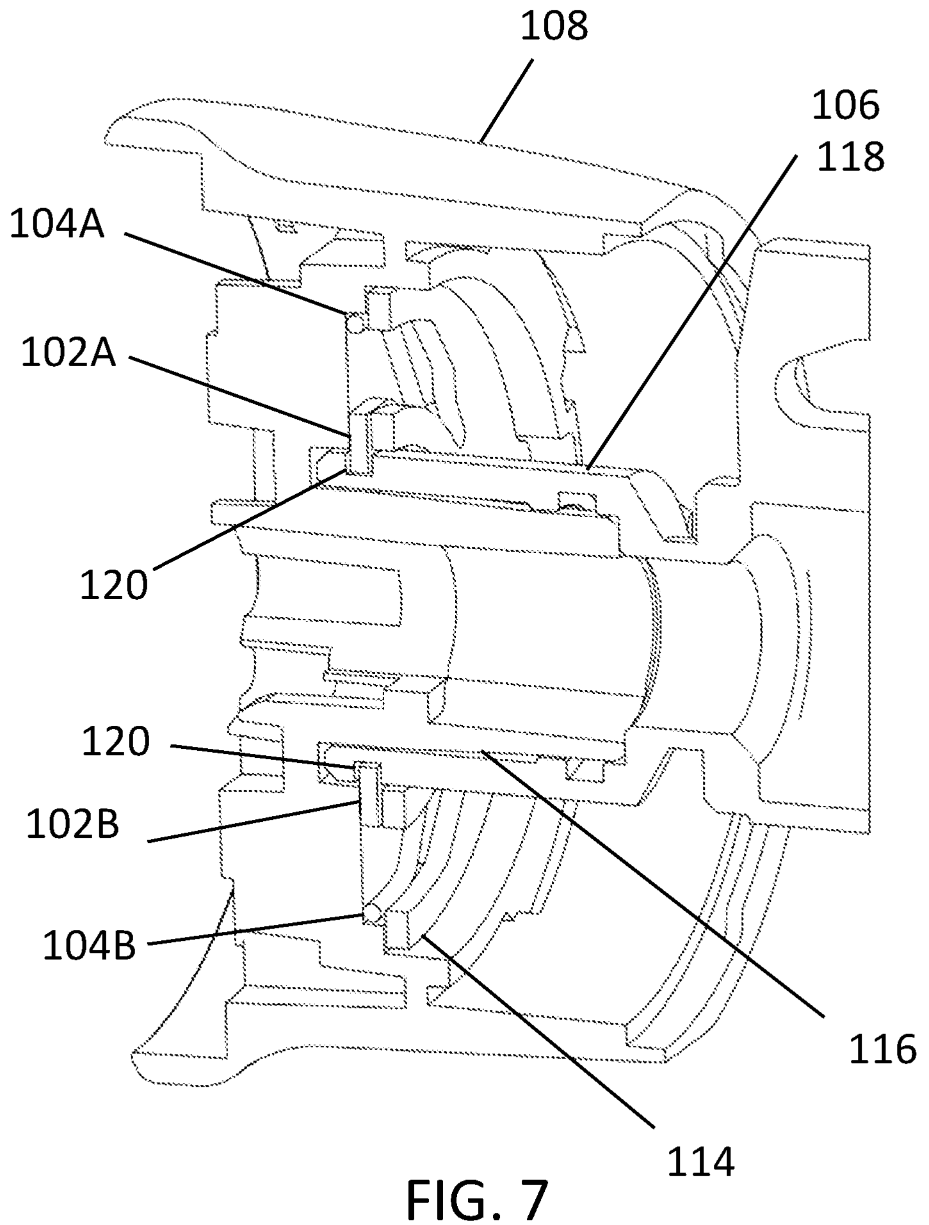

Let us now look at FIG. 7, which is a cross section view of the doorknob 108 and the lock cylinder 106 according to an embodiment. As described above, the first side FS of the doorknob 108 is configured to receive the lock cylinder 106. The doorknob may comprise a first protrusion 116 extending towards the lock cylinder (in the installed state) from inside the doorknob. The protrusion may not extend out of the doorknob as can be seen in FIG. 7. In other words, the protrusion extends substantially inside the doorknob towards the lock cylinder but may not reach out of the doorknob from the first side which is at least partly open. The protrusion is configured to be inserted inside the lock cylinder when the doorknob is attached to the lock cylinder as illustrated in FIG. 7. The lock cylinder 106 may comprise a second protrusion 118 having hollow interior. The hollow interior is configured to receive the first protrusion 116 of the doorknob 108 as illustrated in FIG. 7. The second protrusion in the lock cylinder may comprise a chamfer in an edge of an end which goes into the doorknob as illustrated in FIG. 2. The chamfer hits the locking members in the installation of the doorknob such that the locking members slide over the chamfer to the outer surface of the lock cylinder. The chamfer enables installation of the doorknob to the lock cylinder without the opening tool.

Still referring to FIG. 7, in an embodiment, the lock cylinder comprises holder 120 on the outer surface configured to receive the locking members 102A-B. The holder is configured to receive and hold the locking member(s) in the first position to prevent movements of the doorknob in relation to the lock cylinder. In other words, the holder limits or prevents movement of the locking member in relation to the lock cylinder, and this limits or prevents movement of the doorknob in relation to the lock cylinder. Hence, the holder may be a counterpart for the locking member.

In an embodiment, the holder comprises a groove. The groove may follow the circular shape of the lock cylinder and may extend, at least partly, around the circular lock cylinder The groove may be arranged in the second protrusion 118 of the lock cylinder 106 such that it goes around of the circular protrusion. The spring elements are configured to press the locking members towards the groove such there is contact between the locking members and the groove of the lock cylinder.

In an embodiment, the holder comprises one or more protrusions on the outer surface of the lock cylinder. For example, there may be two protrusion side by side in the lock cylinder extending substantially perpendicularly from the outer surface of the lock cylinder, and a gap between the protrusion is configured to receive the locking member(s). Hence, the protrusion may form the groove.

Figure 9:
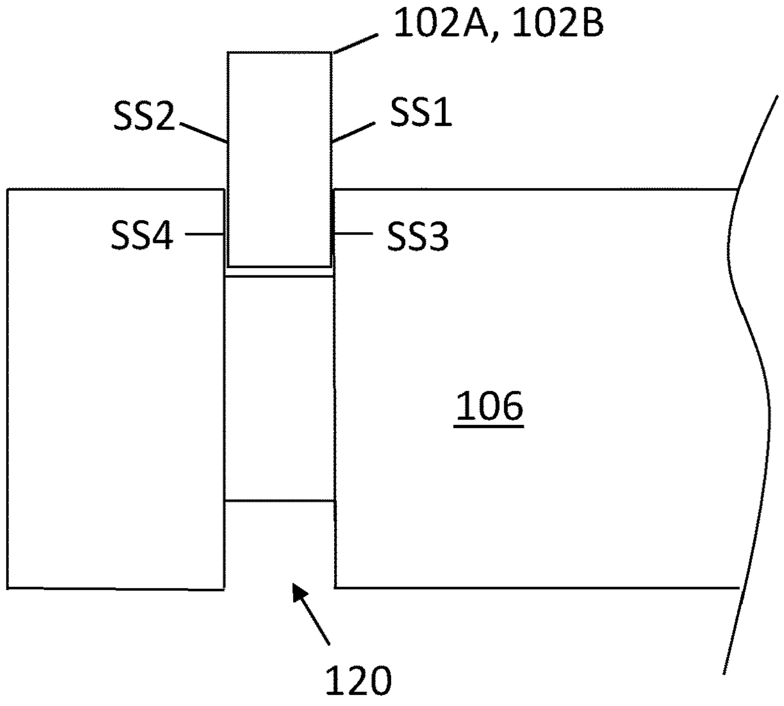

Referring now to FIG. 9, in an embodiment the locking member 102A-B is configured to contact the holder (groove or protrusion) such that a first side surface SS1 of the locking member 102A-B is in contact with a first side surface SS3 of the holder 120 when opening the door by pulling the doorknob, and a second side surface SS2 of the locking member 102A-B is in contact with a second side surface SS4 of the holder 120 when closing the door by pushing the doorknob. Hence, the locking member may not press against a bottom surface of the holder (or the outer surface of the lock cylinder) which may cause scratches to the lock cylinder. In other words, the opposite surface of the locking member may not be in contact with the lock cylinder, instead there may be a gap between the opposite surface(s) and the outer surface of the lock cylinder.

Figure 5:
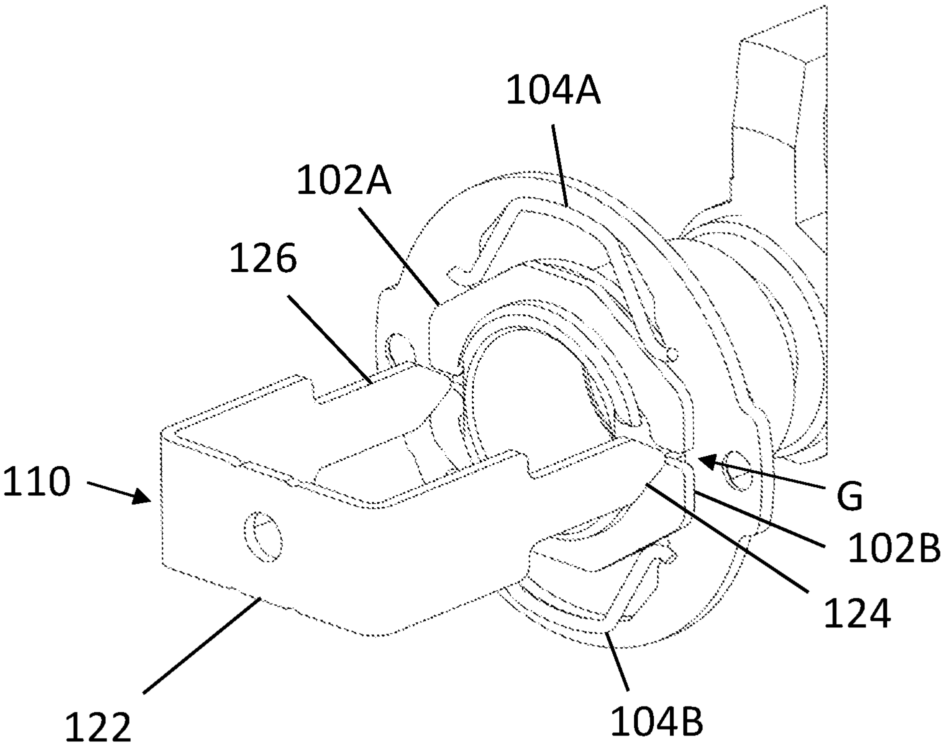

According to a third aspect of the invention, there is provided the opening tool for the fixing mechanism of the doorknob. Referring to FIGS. 4 and 5, in an embodiment, the opening tool 110 comprises a frame 122 having a first and a second legs 124, 126 extending substantially parallelly and perpendicularly from the frame 120. Ends (tips) of the first and the second legs 124, 126 may be tapered. The legs are configured to be inserted into the openings of the doorknob such that the tapered ends get access to the locking members. The tapered end goes to the gap (between the straight sections of the opposite surfaces) and when the opening tool is inserted deep enough the tapered ends force the locking members to the second position. The tapered ends increase the gap between the opposite surfaces. As described above, this enables removal of the doorknob from the lock cylinder. The opening tool may be made of a sheet metal, for example. As illustrated in FIG. 6, the fastening member 114 may comprise holes for the tapered ends of the legs of the opening tool in the vicinity of the gaps G of straight sections of the opposite surfaces such that the end does not hit the fastening member when inserted into the openings of the doorknob. Hence, the opening tool can be inserted deep enough to set the locking members to the second position.

The next example describes how the doorknob with the fixing mechanism may be applied in practice. The installation of the doorknob to the lock cylinder is preformed such that the first protrusion in the doorknob goes inside the second protrusion of the lock cylinder. The locking members may be in the first position when the doorknob is not installed to the lock cylinder, in which they are pressed against the limiter by the spring elements. In the installation, the end of the second protrusion of the lock cylinder hits the locking members such that the locking members slide over the chamfer (taper) arranged in the end of the second protrusion. The locking members are configured to slide over the chamfer to the outer surface of the lock cylinder. Then the locking members move from the first position towards the second position. The holder like the groove may be arranged on the outer surface and may be placed in the vicinity of the chamfered end of the protrusion of the lock cylinder. Hence, when the chamfer has raised the locking members to the outer surface of the lock cylinder, and the doorknob is pushed little further, the locking members go into the groove. Then the fixing mechanism has returned to the first position in which the doorknob is locked with the lock cylinder. It is also possible to use the opening tool in the installation process. The legs of the opening tool may be inserted into the openings of the doorknob such that the tapered ends are in contact with the locking members and force them to the second position (or towards the second position). Then the lock cylinder is inserted into the gap of the locking members and the opening tool is removed. When the opening tool is removed, the locking members move back to the first position and lock the doorknob and the lock cylinder together.

Removal of the doorknob may be performed such that the opening tool is inserted into the openings of the doorknob as described above causing movement of the locking members from the first position to the second position. Then the locking members move away from the groove of the lock cylinder allowing removal of the doorknob from the lock cylinder.

As described above, the first position of the locking members refers to the situation in which the locking members are against the limiter. The locking members are in the first position when the doorknob is attached to the lock cylinder, or when the doorknob is not attached with the lock cylinder. The second position refers to the situation in which the locking members are moved away from each other such that the gap is increased allowing insertion or removal of the lock cylinder from/to the gap. In other words, the second position enables removal of the doorknob from the lock cylinder. The spring element(s) try to return the locking members from the second position to the first position.

Conventionally in a field of the electromechanical locks the doorknob is attached to a core (axle) of the lock causing many challenges. In the invention the doorknob is attached to a body of the lock cylinder (outer surface) which solves many issued of the conventional solutions. The body of the lock is much stronger that the core (axle), and therefore the fixing is very robust. When the doorknob is attached to the body of the lock cylinder, axial forces are directed to the body not to the core. This is very important especially in the electromechanical lock because there may be a plurality of sensitive components in the core/axle which may be damaged. For example, the axle may comprise the electrical components and/or contacts which may limit a size of the axle making the axle weaker. Furthermore, the components and/or contact in the core and axle limits possibilities to attach the doorknob to the core/axle. Also sealing of the lock arrangement is easier when the axial force is not directed to the core/axle. The above-described invention solves many drawbacks of the known doorknob solutions. The fixing mechanism provides attaches the doorknob very strongly to the lock cylinder, but at the same time its installation and removal is simple and fast.

It will be obvious to a person skilled in the art that, as the technology advances, the inventive concept can be implemented in various ways. The invention and its embodiments are not limited to the examples described above but may vary within the scope of the claims.

The invention claimed is:

1. A doorknob with a fixing mechanism comprising:

at least a first locking member arranged in the doorknob configured to move at least between a first and a second positions; and at least a first spring element coupled with the at least first locking member, wherein the spring element is configured to be compressed and to move the locking member towards the first position in which the locking member is configured to be in contact with a lock cylinder, when the doorknob is coupled with the lock cylinder, to prevent, at least partly, movement of the doorknob in relation to the lock cylinder in a longitudinal direction.

2. The doorknob with the fixing mechanism of claim 1, wherein the locking member is configured to move away from the lock cylinder when moving from the first position to the second position such that the locking member is not in contact with the lock cylinder in the second position to enable movement of the doorknob in relation to the lock cylinder in the longitudinal direction.

3. The doorknob with the fixing mechanism of claim 1, wherein the fixing mechanism further comprises a second locking member configured to move at least between the first and the second positions, wherein the first and the second locking member is arranged next to each other in the doorknob such that there is a gap between opposite surfaces of the locking members configured to receive the lock cylinder, wherein the locking members are coupled with the spring element configured to be compressed and to move the locking members towards each other such that in the first position the locking members are configured to be in contact with the lock cylinder, when the lock cylinder is within the gap, to prevent movement of the doorknob in relation to the lock cylinder in the longitudinal direction.

4. The doorknob with the fixing mechanism of claim 3, wherein the locking members are configured to move away from each other when moving from the first position to the second position such that the locking members are not in contact with the lock cylinder in the second position to enable movement of the doorknob in relation to the lock cylinder in the longitudinal direction.

5. The doorknob with the fixing mechanism of claim 3, wherein fixing mechanism further comprises a second spring element coupled with the second locking member, wherein the second spring element is configured to be compressed and to move the second locking member towards the first position.

6. The doorknob with the fixing mechanism of claim 3, wherein the opposite surfaces of the locking members each comprises a curved section to form the gap for receiving the lock cylinder.

7. The doorknob with the fixing mechanism of claim 6, wherein the opposite surfaces of the locking members each further comprises straight sections arranged such that the curved section is between the straight sections.

8. The doorknob with the fixing mechanism of claim 3, wherein the spring elements comprises a first and a second end, wherein the first end is in contact with the locking member and the second end (is in contact with the doorknob, and the doorknob is configured to prevent movement of the second end of the spring elements in relation to the doorknob.

9. The doorknob with the fixing mechanism of claim 3, wherein the arrangement further comprises a limiter arranged between the opposite surfaces of the locking members configured to limit a size of the gap in the first position.

10. The doorknob with the fixing mechanism of claim 1, wherein the doorknob comprises one or more openings in one side configured to enable access of an opening tool to the at least first locking member arranged in the doorknob to move the at least first locking member from the first position to the second position.

11. The doorknob with the fixing mechanism of claim 1, wherein the arrangement further comprises a fastening member configured to fasten the fixing arrangement in the doorknob.

12. A lock arrangement comprising:

the doorknob with the fixing mechanism of claim 1; and a lock cylinder.

13. The lock arrangement of claim 12, wherein the lock cylinder comprises a holder on an outer surface configured to receive at least a first locking member.

14. The lock arrangement of claim 13, wherein the holder comprises a groove.

15. An opening tool for a doorknob with a fixing mechanism comprising:

a frame having at least a first and a second leg extending substantially perpendicularly from the frame, wherein ends of the first and the second legs are tapered, wherein the first and the second legs of the opening tool are configured to be inserted into, respectively, openings of the doorknob, wherein, when inserted, the tapered ends of the first and second legs contact with locking members of the doorknob and, respectively, force the locking members to another position to enable removal of the doorknob from a lock cylinder.

* * * * *